Figure 3:
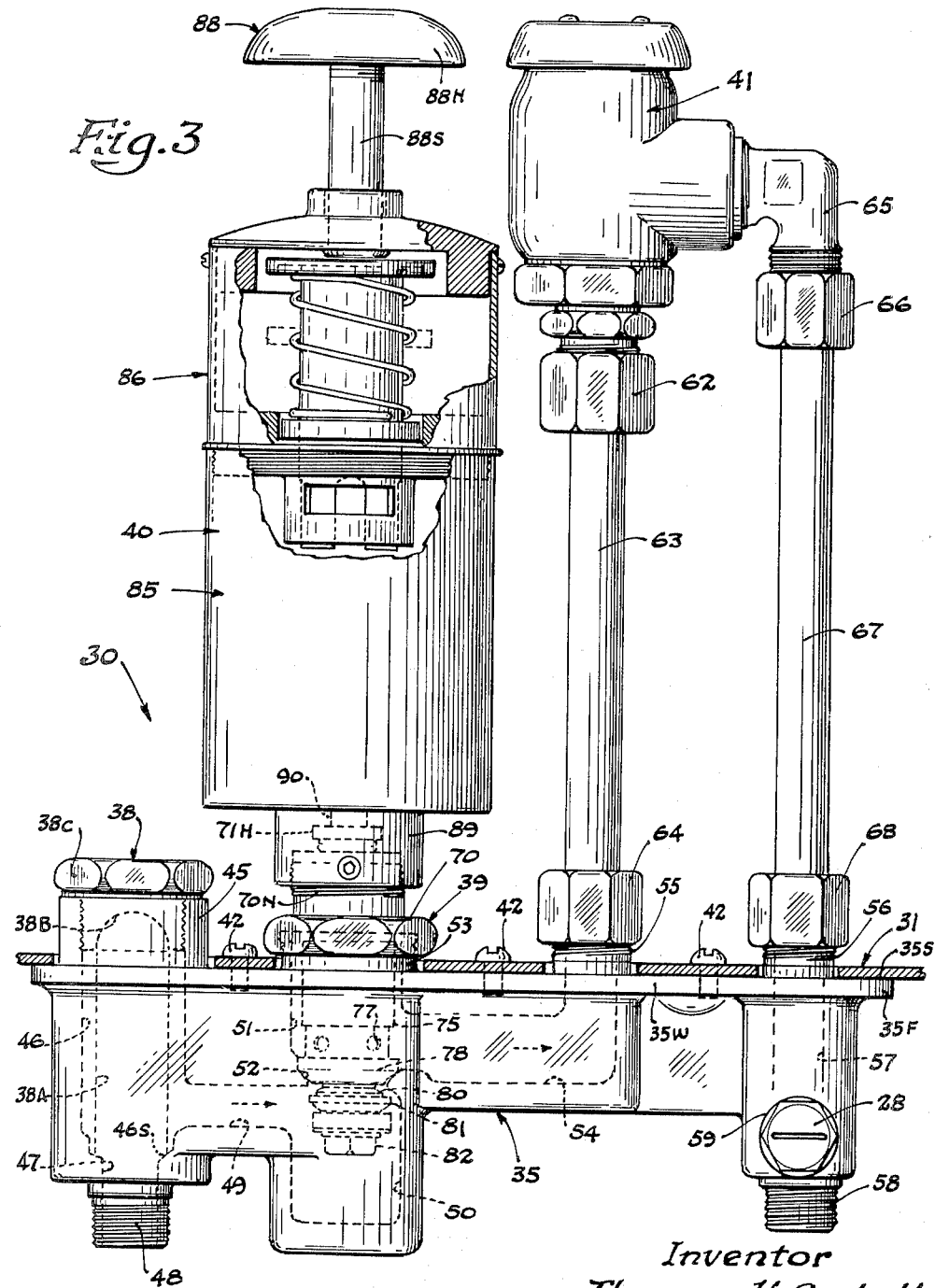

May 1, 1956  T. H. CORBETT  2,743,736
WATER SUPPLY UNITS FOR GLASS WASHERS AND THE LIKE
Original Filed Sept. 15, 1952  2 Sheets-Sheet 1
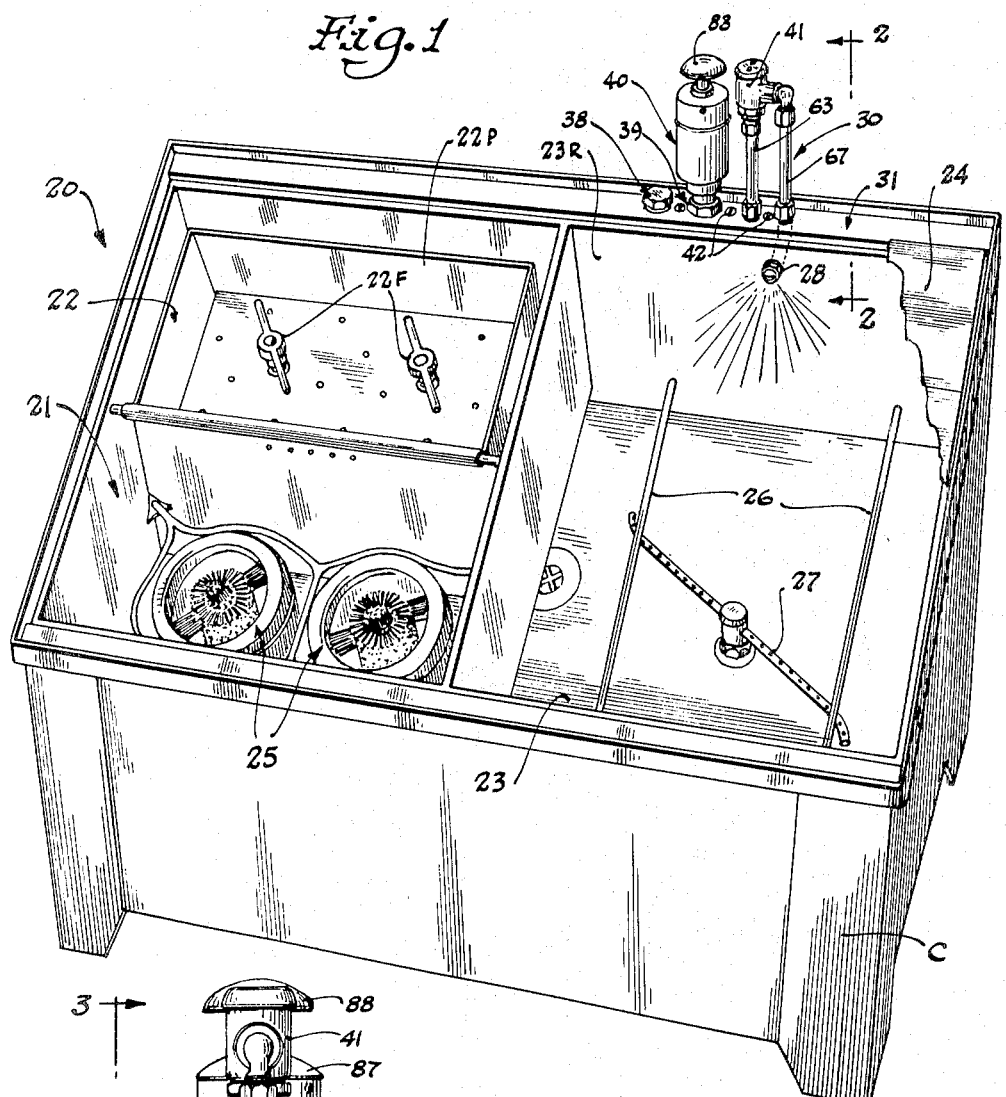
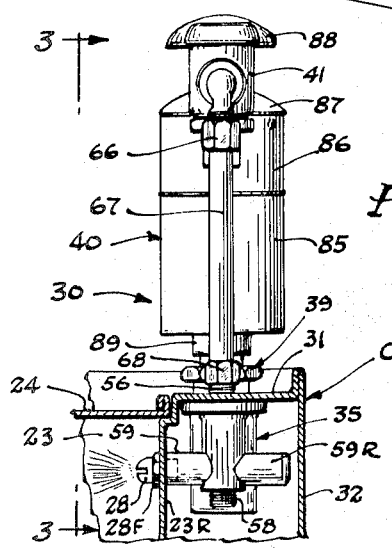
Inventor
Thomas H. Corbett
By Fred Bing
Attorney May 1, 1956 T. H. CORBETT 2,743,736
WATER SUPPLY UNITS FOR GLASS WASHERS AND THE LIKE
Original Filed Sept. 15, 1952 2 Sheets-Sheet 2

Inventor
Thomas H. Corbett
By Fred Bing
Attorney

United States Patent Office 2,743,736
Patented May 1, 1956

2,743,736

WATER SUPPLY UNITS FOR GLASS WASHERS AND THE LIKE

Thomas H. Corbett, Chicago, Ill.

Original application September 15, 1952, Serial No. 309,609, now Patent No. 2,693,852, dated November 9, 1954. Divided and this application January 5, 1954, Serial No. 402,383

2 Claims. (Cl. 137—215)

This application is a division of my copending application Serial No. 309,609, filed September 15, 1952, now Patent No. 2,693,852 granted November 9, 1954.

This invention relates to water supply units for glass washers and the like, and particularly to such units that are adapted to have timing means associated therewith.

In commercial restaurant operation it is quite common to use glass washing apparatus wherein rotating scrubbing drums operating in a cleansing solution are utilized to scrub the inside and outside of each glass, and after such cleansing operation, the glasses are placed in wire racks or baskets and are transferred into a rinsing compartment of the machine where a rinsing operation with hot water is performed. One form of scrubbing drum utilized in such machines is disclosed in Vincent W. Cunningham Patent No. 2,153,238, patented April 4, 1939, but it will be recognized insofar as the present invention is concerned, other forms of scrubbing or washing apparatus may be utilized.

The above mentioned rinsing operation is considered to be important not only in removing the cleansing solution from the glass but also from the standpoint of the sterilizing effect that may be obtained by maintaining the rinsing water at a pre-determined high temperature and continuing the rinsing operation for a pre-determined minimum period. This sterilizing action has been considered so important in recent years that under many of the public health codes in force in various cities and states, a minimum water temperature and a minimum rinse period have been established.

In an effort to simplify the matter of compliance with such public health codes, manufacturers of glass and dish washing equipment have embodied automatically controlled means for governing the rinse period, and it is with this aspect of the glass washing machine that the present invention is concerned. In the prior efforts to automatically control the rinse period, various expedients have been employed, but such expedients have almost universally been considered to be too costly, or have been difficult to repair and maintain. In view of this, it is the primary object of the present invention to simplify the attainment of an automatically controlled or timed rinse period in glass washing machines of the aforesaid type, and objects related to the foregoing are to attain a timed rinse in such a machine through the use of mechanism that is simple and inexpensive in character and which may be repaired or replaced in a simple manner.

A further and important object of the present invention is to afford such a timed rinse structure for glass washing machines wherein the timing action is obtained by hydraulic means, and a further object is to attain this end through the use of a hydraulic unit that may readily be replaced without moving the glass washer and without disassembly of any of the major elements of the glass washer.

In the prior mechanisms for attaining a timed rinse in glass washers, it has been customary to employ electrical means which required the services of electrical workers not only in the assembly but in any repair or replacement, and these prior devices were somewhat difficult of installation because of the necessity for establishing electrical connections to the electrically operated elements, and in such prior devices the various electrical and electrically operated elements were disposed about and within the cabinet in such a way to make assembly and repair relatively difficult. In view of this it is a further object of the present invention to afford an automatic rinse controlling and timing mechanism that is constructed as a unit which may readily be installed on a glass washer cabinet and which may be readily connected with the related parts or elements of the apparatus, and objects related to the foregoing are to afford such a unit wherein a control valve, a strainer and a vacuum breaker required in such glass washing machines may be associated as a unit at a single location on the glass washer cabinet, thereby to facilitate assembly, and to provide a manifold which, when mounted in place on the cabinet, will readily permit the installation, removal or replacement of the strainer, the vacuum breaker and a hydraulic timing unit embodying the features of the invention.

Other and further objects of the present invention will be apparent from the following description and claims and are illustrated in the accompanying drawings which, by way of illustration, show a preferred embodiment of the present invention and the principle thereof and what I now consider to be the best mode in which I have contemplated applying this principle. Other embodiments of the invention embodying the same or equivalent principles may be used and structural changes may be made as desired by those skilled in the art without departing from the present invention and the purview of the appended claims.

In the drawings:

Fig. 1 has top front perspective view of a glass washer embodying the timed rinse mechanism of the present invention;

Fig. 2 is a fragmental vertical sectional view taken substantially along the line 2—2 of Fig. 1; and Fig. 3 is an enlarged fragmentary elevational view of the timing unit and the related strainer and vacuum breaker elements, the view being taken at an enlarged scale from the line 3—3 of Fig. 2.

For purposes of disclosure the invention is herein illustrated as embodied in glass washer 20 having a floor mounted cabinet C within the upper side of which a multiple compartment sink structure is mounted which affords a washing compartment 21, a flushing compartment 22 and a rinsing compartment 23. The washing compartment 21 is located along the forward side of the cabinet and extends substantially one-half way to the rear side of the cabinet, the flushing compartment occupying the remainder of the space between the washing compartment and the rear wall of the structure. The rinsing compartment 23 occupies the right hand end portion of the sink structure and extends entirely between the front and rear walls of the sink structure. It will be noted that the division wall between the rinsing compartment and the other two compartments is located substantially midway between the end walls of the cabinet, and this enables a sliding cover 24 to be positioned selectively over the rinsing compartment 23, or over the other two compartments. This conventional cover structure and relationship is utilized in facilitating the handling of the glasses and the trays or baskets in which such glasses are placed for convenience of handling after washing.

The washing compartment 21 has a pair of glass washing drums 25 mounted therein on vertical axes in substantially the manner disclosed in the aforesaid Cunningham patent, and these glass washing drums 25 are arranged to operate in a submerged condition, the cleansing solution being provided in the compartment 21 so as to be above the upper level of these drums. The flushing compartment 22 has a removable perforated pan 22P mounted therein, and a pair of flushing nozzles 22F are extended through the bottom of this pan so that glasses that are unusually dirty may be flushed before being washed in the constantly rotating scrubbing drums 25. During the washing operation, the cover 24 is located, in its right hand position over the rinsing compartment 23, so that a rinsing operation may be in progress during such washing of further glasses, and a basket is normally located at top of the cover 24 so that the glasses may be placed in such basket according to conventional practice after the washing has been completed. The cover 24 is then slid to the left so as to disclose the interior of the rinsing compartment 23, and any glasses contained therein are removed. The loaded tray of the newly washed glasses is then loaded into the rinsing compartment on to a pair of supporting rods 26 that are spaced upwardly from the bottom wall of the rinsing compartment. The newly washed basket of glasses is then in position for the performance of the rinsing operation, and after closure of the cover 24, this is accomplished by a conventional rotating rinsing arm 27 located in the bottom of the rinsing compartment 23 below the level of the rods 26 and by an upper stationary spray 28 that projects through the back wall of the rinsing compartment adjacent to the upper edge thereof.

The rinsing operation is initiated and automatically timed and controlled by a timing unit 30 embodying the features of the present invention, and located on an upwardly facing rear ledge 31 that is formed along the rear edge of the sink structure, the unit 30 in the present instance being located directly behind the rinsing compartment 23 so as to simplify the assembly of the structure.

As shown in Fig. 2 of the drawings, the shelf 31 is provided as a horizontal strip connecting the rear wall 23R of the rinsing compartment 23 and the rearwardly spaced rear wall 32 of the cabinet C, and the control unit 30 under the present invention is so constructed and arranged that a common mounting casting 35 permanently fixed to the lower face of the shelf 31 in the space between the walls 23R and 32 serves as a mounting for accessibly supporting and operatively associating those elements of the control unit 30 to which access must be had from time to time. Such elements comprise a removable strainer 38, a replaceable valve unit 39, a hydraulic timer and control mechanism 40, a vacuum breaker 41 and the nozzle 28. The casting 35 is elongated in form and has horizontal flanges 35F and a web portion 35W forming a generally flat upper surface 35S that fits against the lower face of the ledge 31 and is secured thereby by a plurality of screws 42 extended through the ledge 31 and threaded into the casting 35, and at spaced points along such upper surface 35S upwardly extending mounting or connecting means project through appropriate openings in the shelf or ledge 31 for connection or mounting of the strainer 38, the valve unit 39 and the vacuum break 41, as will be described hereinafter.

Thus, at the left end of the casting 35S, as shown in Fig. 3, an upwardly extended sleeve 45 is formed which affords an upward continuation of a vertical chamber 46 that is formed in the casting 35. This chamber 46 terminates at its lower end in an upwardly facing annular shoulder 46S, and beyond this shoulder an inlet passage 47 extends downwardly through a connecting nipple 48 which projects from the bottom of the casting 35. At its upper end the sleeve 45 is internally threaded so that the cap 38C of the strainer unit 38 may be removably mounted as a closure for the upper end of the chamber 46. The strainer comprises a cylindrical screen 38A, the lower end of which is seated on the shoulder 46S. At its upper end the screen 38A is seated in a generally spherical recess 38B formed in the strainer cap 38C. Water entering the inlet 47 and passing through the strainer 38 passes to the right from the chamber 46 through a horizontal passage 49 into a lower valve chamber 50 which is located beneath an upper valve chamber 51, and these two chambers are divided by an annular locating ledge or shoulder 52. At its upper end the chamber 51 is defined by an upwardly projecting nipple 53 which serves as a mounting means for the valve unit 39, and this valve unit extends downwardly into the chambers 51 and 50 and cooperates with the shoulder 52 so as to control flow of water from the lower chamber 50 to the upper chamber 51 as will be described in detail hereinafter.

Water that passes the valve into the upper chamber 51 then flows to the right, Fig. 3, through a horizontal passage 54 and then upwardly through an upwardly projecting externally threaded nipple 55. This nipple 55 constitutes one element of the mounting for the vacuum breaker 41, and the other mounting element is afforded by a similar nipple 56 located near the right hand end of the casting 35 as shown in Fig. 3. The nipple 56 opens downwardly into a distributing or outlet chamber 57, formed in the casting 35, the lower end of such chamber 57 terminating in a downwardly projecting nipple 58 through which connection with the rotating spray structure 27 may be established in the usual manner. The outlet chamber 57 also has a forward extension 59 into which the nozzle 28 is threaded so that the nozzle 28 also receives water from the chamber 57. The nozzle 28 has a flange 28F which clamps the wall 23R against the annular end of the member 59. As shown in Fig. 2, the casting 35 has a rearward projection 59R similar to the element 59, this element 59R being cast solid and affording means whereby the casting may be readily used for either right or left hand mounting.

The vacuum breaker 41 is of conventional form and has its inlet connected by a fitting 62 to the upper end of an inlet pipe 63, the lower end of which is connected by a fitting 64 to the nipple 55. The outlet of the vacuum breaker 41 is connected by an elbow 65 and a fitting 66 to the upper end of a pipe 67, the lower end of which is connected by a fitting 68 to the nipple 56.

The valve assembly 39 is conventional in structure and includes a mounting cap 70 with a downwardly extended internally screw threaded annular flange 70F and an upwardly extended concentric externally threaded nipple 70N. The nipple 70N has a valve stem slidably associated therewith in the manner disclosed in my aforesaid co-pending application and the valve stem has an upper head 71H which overlies the top of the nipple 70N and spring means act on the stem to urge the same upwardly.

The valve stem extends downwardly through a hollow sleeve 75 which abuts at its upper end against the lower surface of the cap 70. Near its lower end the sleeve 75 has a valve seat 78, above which outlet ports 77 are formed in the sleeve 75, as described in my aforesaid co-pending application. The passage afforded through the valve seat 78 is controlled by a valve washer 80 fixed on the lower end of the valve stem by means including a retainer 81 and a nut 82 threaded onto the lower end of the valve stem. The valve 39 is mounted by inserting the valve downwardly into the chamber 51 and tightening the threaded flange 70F onto the nipple 53, and this firmly presses the seat 78 onto the flange or seat 52 of the casting 35. Thus the valve member 80, which is urged normally to its seated or closed relation by the spring means that are included in the valve, serves to govern flow from the chamber 50 to the chamber 51, and the valve may be opened by downward actuation of the valve stem 71.

The hydraulic timing and control unit 40 is best shown in Fig. 3 of the drawings and is afforded by a sectional cylindrical casing having a lower section 85, an upper section 86, a cover 87 and an operating handle 88 that has rounded actuating head 88H and a downwardly projecting stem 88S that extends slidably downwardly through the cover 87.

The lower section 85 of the casting is cylindrical in form with a downwardly extending mounting sleeve 89 formed thereon which is concentric with the section 85 and which is internally threaded so that the section 85 may be mounted on the nipple 70N in axial alignment with the valve 39 and with the head 71H of the valve stem located within a clearance chamber that is afforded within the sleeve 89. This clearance chamber provides for the required up and down movement of the head 71H.

While the full details of the structure and operation of the timer 40 are set forth in my aforesaid application, it may be observed that by downward actuation of the handle 88H, a stem within the section 85 is forced downwardly so as to actuate the valve member 80 to its open position. As described in such co-pending application, the valve member is maintained in its open position for a predetermined time by means that are housed within the section 85 of the timer.

From the foregoing description it will be apparent that the present invention affords a water supply and control unit for dishwashers, glass washers and the like that is extremely simple in structure and which may be readily and easily installed. This water supply unit is of such a character that it is adapted to be located in a conveniently accessible location so that the servicing or replacement thereof may be readily accomplished. Such servicing and replacement may, of course, be done by an ordinary mechanic so as to make the upkeep and servicing of the glass washer relatively inexpensive.

Thus, while I have illustrated and described the preferred embodiment of my invention, it is to be understood that this is capable of variation and modification, and I therefore do not wish to be limited to the precise details set forth, but desire to avail myself of such changes and alterations as fall within the purview of the following claims.

I claim:

1. In a unit for supplying water for a predetermined time interval in a glass washer or the like, an elongated manifold casting having a top, bottom walls, and vertical side and end walls and having a generally flat upper face for locating said casting in its position of use, said casting having four upstanding connecting nipples formed on its upper wall, said casting having a strainer chamber formed beneath the first of said nipples and having an inlet opening at the lower end thereof, a strainer located in said strainer chamber and having an element engaging said first nipple to hold the strainer in place, said casting having a valve inlet chamber and a valve outlet chamber located one above the other and beneath the second of said nipples, and said valve inlet chamber having a passage connecting the same with said strainer chamber, a valve fixed to the second nipple and located in said valve inlet and outlet chambers for controlling flow therebetween, a passage extending from said outlet chamber to the third nipple, a distributing chamber located beneath and connected to the fourth nipple and having an outlet, and a vacuum breaker connected between and supported above the third and fourth nipples.

2. In a unit for supplying water for a predetermined time interval in a glass washer or the like, an elongated manifold casting having a top, bottom walls, and vertical side and end walls and having a generally flat upper face for locating said casting in its position of use, said casting having four upstanding connecting members formed on its upper wall, said casting having a strainer chamber formed beneath the first of said members and having an inlet opening at the lower end thereof, a strainer located in said strainer chamber and having an element engaging said first member to hold the strainer in place, said casting having valve inlet chamber and a valve outlet chamber located one above the other and beneath the second of said members and said valve inlet chamber having a passage connecting the same with said strainer chamber, a valve fixed to the second member and located in said valve inlet and outlet chambers for controlling flow therebetween, a passage extending from said outlet chamber to the third member, a distributing chamber located beneath and connected to the fourth member and having an outlet, and a vacuum breaker connected between and supported above the third and fourth members.

References Cited in the file of this patent

UNITED STATES PATENTS

| Number | Name | Date |
|---|---|---|
| 756,517 | Miller | Apr. 5, 1904 |
| 2,055,954 | Tokheim | Sept. 29, 1936 |
| 2,155,868 | Pauly | Apr. 25, 1939 |
| 2,412,760 | Svirsky | Dec. 17, 1946 |
| 2,626,634 | McDowell | Jan. 27, 1953 |
| 2,637,044 | Low | May 5, 1953 |
| 2,647,528 | Bornegesser | Aug. 4, 1953 |
| 2,664,261 | Stephany | Dec. 29, 1953 |
| 2,704,083 | Low | Mar. 15, 1955 |